United States Patent
Long et al.

(10) Patent No.: US 9,285,789 B2
(45) Date of Patent: Mar. 15, 2016

(54) COGENERATION UNIT AND WIND POWER JOINT HEATING SYSTEM AND SCHEDULING METHOD THEREFOR

(71) Applicants: Hongyu Long, Beijing (CN); Kunyao Xu, Beijing (CN); Jianjun He, Beijing (CN); Xingzhe Hou, Beijing (CN); Ruilin Xu, Beijing (CN); Kai Wu, Beijing (CN)

(72) Inventors: Hongyu Long, Beijing (CN); Kunyao Xu, Beijing (CN); Jianjun He, Beijing (CN); Xingzhe Hou, Beijing (CN); Ruilin Xu, Beijing (CN); Kai Wu, Beijing (CN)

(73) Assignees: State Grid Corporation of China, Beijing (CN); Chongqing Electric Power Research Institute, Chongqing (CN)

( * ) Notice: Subject to any disclaimer, the term of this patent is extended or adjusted under 35 U.S.C. 154(b) by 398 days.

(21) Appl. No.: 13/976,934

(22) PCT Filed: Oct. 22, 2012

(86) PCT No.: PCT/CN2012/083288
§ 371 (c)(1),
(2) Date: Jun. 27, 2013

(87) PCT Pub. No.: WO2013/060252
PCT Pub. Date: May 2, 2013

(65) Prior Publication Data
US 2014/0121848 A1    May 1, 2014

(30) Foreign Application Priority Data
Oct. 23, 2011    (CN) .......................... 2011 1 0324048

(51) Int. Cl.
| G05D 11/00 | (2006.01) |
| G05B 15/02 | (2006.01) |
| F03D 9/00 | (2006.01) |
| F02C 6/00 | (2006.01) |
| H02J 3/46 | (2006.01) |

(52) U.S. Cl.
CPC . *G05B 15/02* (2013.01); *F02C 6/00* (2013.01); *F03D 9/00* (2013.01); *H02J 3/46* (2013.01); *F25B 2600/07* (2013.01); *Y02E 10/725* (2013.01); *Y02E 10/763* (2013.01); *Y02E 20/14* (2013.01)

(58) Field of Classification Search
CPC ...................................................... G05B 15/00
USPC ........................... 700/291; 429/495; 165/299
See application file for complete search history.

(56) References Cited

U.S. PATENT DOCUMENTS

| 2005/0143865 A1* | 6/2005 | Gardner ......................... 700/291 |
| 2008/0186670 A1* | 8/2008 | Lyon et al. .................... 361/687 |
| 2010/0047645 A1* | 2/2010 | Miyauchi et al. ............... 429/24 |
| 2011/0139259 A1* | 6/2011 | Nagata et al. .................... 137/1 |
| 2011/0315093 A1* | 12/2011 | Minamisako et al. ......... 122/1 R |
| 2012/0016528 A1* | 1/2012 | Raman et al. ................. 700/291 |

FOREIGN PATENT DOCUMENTS

| CN | 101950962 A | 1/2011 |
| CN | 101950963 A | 1/2011 |
| CN | 101950964 A | 1/2011 |
| CN | 102506450 A | 6/2012 |
| CN | 102506519 A | 6/2012 |
| CN | 102520675 A | 6/2012 |
| JP | 2005151746 A | 6/2005 |
| WO | WO 2009078181 A1 | 6/2009 |

OTHER PUBLICATIONS

International Search Report and Written Opinion (in Chinese language) issued by the State Intellectual Property Office of the P.R. China, dated Jan. 17, 2013, for related International Application No. PCT/CN2012/083288; 12 pages.

English translation of the International Search Report issued by the State Intellectual Property Office of the P.R. China, dated Jan. 17, 2013, for related International Application No. PCT/CN2012/083288; 4 pages.

\* cited by examiner

*Primary Examiner* — Robert Fennema
*Assistant Examiner* — Anthony Whittington
(74) *Attorney, Agent, or Firm* — Faegre Baker Daniels LLP (57) ABSTRACT

A cogeneration unit and wind power joint heating system and a scheduling method therefor. The joint heating system comprises a coal-fired steam-extraction condensing-steam cogeneration unit (A), a wind turbine generator unit (B), an air conditioner heat pump (108) parallel-connected to the coal-fired steam-extraction condensing-steam cogeneration unit (A) and to the wind turbine generator unit (B) via a power cable network (113), and a hot water heating radiator (110) connected to the coal-fired steam-extraction condensing-steam cogeneration unit (A) via a heating pipe network (114). The joint heating system also comprises an integrated scheduling control device (115), a first remote centralized controller (1121), a second remote centralized controller (1122), and a third remote centralized controller (1123). Heating is provided to a user by the hot water heating radiator (110) and the air conditioner heat pump (108); while electricity is provided jointly by the coal-fired steam-extraction condensing-steam cogeneration unit (A) and the wind turbine generator unit (B). The scheduling method comprises: after detecting over a period of time the state of power supply and the state of power consumption of the user via the integrated scheduling control device (115), making a prediction for an upcoming period of time, and then scheduling on this basis. Under the premise of ensuring electricity supply and heat supply, the scheduling method reduces hot water flow outputted for heating, and compensates with electricity heating.

10 Claims, 3 Drawing Sheets

COGENERATION UNIT AND WIND POWER JOINT HEATING SYSTEM AND SCHEDULING METHOD THEREFOR

This application is the national phase of International Application No. PCT/CN2012/083288, titled "COGENERATION UNIT AND WIND POWER JOINT HEATING SYSTEM AND SCHEDULING METHOD THEREFOR", filed on Oct. 22, 2012, which claims priority to Chinese patent application No. 201110324048.4 titled "COGENERATION UNIT AND WIND POWER JOINT HEATING SYSTEM AND SCHEDULING METHOD THEREFOR" and filed with State Intellectual Property Office of PRC on Oct. 23, 2011, which are incorporated herein by reference in its entirety.

FIELD OF THE INVENTION

The present invention generally relates to the field of comprehensive utilization technology of clean energy, and in particular to a joint heat supply system of combined heat and power unit and wind power generation unit and a scheduling method thereof.

BACKGROUND OF THE INVENTION

Renewable energy source is environmental-friendly and clean and has been rapidly developing in recent years. Taking the wind power as an example, the wind power can be used as a clean low-carbon energy source, but the large-scale grid-connection of wind farms causes adverse effect on the safe and economic-effective operation of the power grid. In the case of the large-scale grid-connection of wind farms, the output of the wind power changes significantly, and the change in the power has a contrast trend as compared to the change of the electric load, that is, there is no wind available during the peak period of the load, and there is abundant wind energy in the valley period of the load. This anti-peaking characteristic of the wind power may lead to further increase of the difference between peak and valley in the system, thus the difficulty of grid scheduling is increased, leading to a series of effects on the operation of grid scheduling, the control of voltage, the peak regulation of grid and so on. Wind abandon is common due to insufficient researches. For example, in Inner Mongolia, the grid can operate at full capacity during day, but during night "wind abandon" is adopted for wind power at off-peak hours of electric loads to ensure the heat supply for urban residents, which is a great pity.

SUMMARY OF THE INVENTION

The object of the present invention is to provide a joint heat supply system of combined heat and power unit and wind power generation unit and a scheduling method thereof, in which the smooth output of wind power is realized and the effective utilization of the wind power is improved by comprehensive regulation and control of the thermal power and electric power.

The invention is achieved by the following technical solution:

a joint heat supply system of combined heat and power unit and wind power generation unit, including:

a coal-fired condensing-extraction combined heat and power unit, configured to produce electric power and heating water;

a wind power generation unit configured to produce electric power;

an air conditioner heat pump of a user, which is connected in parallel with the coal-fired condensing-extraction combined heat and power unit and the wind power generation unit via a power cable network; a remote switch for the air conditioner heat pump, configured to control the air conditioner heat pump;

a power meter configured to collect non-heating power consumption of the user;

a water-heating radiator of the user, which is connected with the coal-fired condensing-extraction combined heat and power unit via a heat supply network; a water consumption meter for the water-heating radiator, configured to detect a hot water consumption of the water-heating radiator; a remote switch for the water-heating radiator, configured to control the water-heating radiator;

a first remote centralized controller configured to collect capacity information of water flow for heating output and electricity for power output in the coal-fired condensing-extraction combined heat and power unit, to transmit the capacity information to a comprehensive scheduling device, to receive a scheduling signal transmitted from the comprehensive scheduling device, and to control a control and execution device of the coal-fired combined heat and power unit to actuate according to the scheduling signal;

a second remote centralized controller configured to collect capacity information of electricity for power output in the wind power generation unit, and to transmit the capacity information to the comprehensive scheduling device;

a third remote centralized controller configured to store pipeline distance information between the water-heating radiator of the user and the coal-fired condensing-extraction combined heat and power unit, to collect capacity information including hot water inflow and non-heating power consumption detected by the water consumption meter for the water-heating radiator and the non-heating power consumption of the user; to collect thermal inertia time input by the user; and to transmit the pipeline distance information of the user, the collected capacity information and the thermal inertia time to the comprehensive scheduling device;

in which the third remote centralized controller is further configured to receive the scheduling signal transmitted by the comprehensive scheduling device and drive the remote switch for the air conditioner heat pump and/or the remote switch for the heating radiator to actuate according to the scheduling signal; and in which the comprehensive scheduling device generates the scheduling signal according to the received capacity information, and the pipeline distance information and the power consumption information of the user and transmits the scheduling signal to the first remote centralized controller and/or the third remote centralized controller.

Under a condition that the power supply and heat supply are satisfied, according to the received capacity information of the coal-fired condensing-extraction combined heat and power unit and the wind power generation unit and the power consumption information of the user, the comprehensive scheduling device reduces the water flow for heating output in the coal-fired condensing-extraction combined heat and power unit and the insufficient heat supply for the user due to the reduced hot water flow is compensated by the heat supply from the air conditioner heat pump consuming electricity; and the comprehensive scheduling device transmits the scheduling signals including the water flow for heating output and the electricity for power output in the coal-fired condensing-extraction combined heat and power unit during the scheduled time, amount of the hot water flowing into the water-heating radiator and the heating power consumption of the air conditioner heat pump.

When heating is compensated for by the air conditioner heat pump consuming power, how long it is spent for the hot water to flow to and arrive at the user and the thermal inertia time are taken into consideration.

The comprehensive scheduling device includes:

a first data receiving unit configured to receive the capacity information of the coal-fired condensing-extraction combined heat and power unit and the wind power generation unit, and the pipeline distance information and the power consumption information of the user;

a data decoder unit configured to decode all of the received data;

a data storage unit configured to store all of the decoded data;

a scheduling signal calculation unit configured to generate the scheduling signal;

a signal encoder configured to encode the scheduling signal; and a transmitting unit configured to transmit the generated signal to the first remote centralized controller and the third remote centralized controller.

The comprehensive scheduling device is connected with a cloud compute service system via a power optical fiber and drives the cloud compute service system to compute for the scheduling signal; the comprehensive scheduling device receives the scheduling signal obtained by the cloud compute service system via the power optical fiber, and then transmits the scheduling signal to the first remote centralized controller and/or the third remote centralized controller via the power optical fiber or by way of wireless transmission.

The remote switch for the water-heating radiator is coupled with the comprehensive scheduling device in a remote control way via the third remote centralized controller; the remote switch for the air conditioner heat pump is coupled with the comprehensive scheduling device in the remote control way via the third remote centralized controller; on the air conditioner heat pump, there is further provided an air-conditioner heat pump-specific power meter configured to detect the power consumption of the air conditioner heat pump, which is collected by the third remote centralized controller;

the control and execution device of the coal-fired combined heat and power unit is coupled with the comprehensive scheduling device in the remote control way via the first remote centralized controller; the control and execution device of the coal-fired combined heat and power unit controls, according to the scheduling signal, a coal feed valve, a boiler steam inlet valve, a heating steam extraction valve and a power generation steam flow valve connected with the control and execution device of the coal-fired combined heat and power unit to actuate.

The third remote centralized controller includes a non-heating power meter pulse counter, a heating water flow pulse counter, a pulse signal encoding converter and a measuring signal amplification transmitter, as well as a control signal receiving decoder and a remote signal generator which are connected to each other;

the non-heating power meter pulse counter is connected with a non-heating power meter of the user and is configured to detect non-heating power consumption of the user, which is processed by the pulse signal encoding converter and the measuring signal amplification transmitter and is transmitted to the comprehensive scheduling device;

the heating water flow pulse counter is connected with the water consumption meter for the water-heating radiator and is configured to detect the hot water inflow, which is processed by the pulse signal encoding converter and the measuring signal amplification transmitter to generate a signal which is transmitted to the comprehensive scheduling device together with the pipeline information of the user; and the control signal receiver decoder receives and decodes the schedule information transmitted by the comprehensive scheduling device, and transmits the control signal to the remote switch for the air conditioner heat pump and the remote switch for the water-heating radiator for actuation via the control signal remote transmitter.

The control and execution device of the coal-fired combined heat and power unit includes a scheduling signal transceiver encoder storage, a drive circuit and a mechanical gear control device; the scheduling signal is decoded by the scheduling signal transceiver encoder storage, so as to generate a schedule command for the coal-fired combined heat and power unit; the mechanical gear control device is triggered by a power drag signal output by the drive circuit; then the mechanical gear control device controls the coal feed valve, the heating steam extraction valve and the power generation steam flow valve of the coal-fired combined heat and power unit to actuate.

A scheduling method of the joint heat supply system of combined heat and power unit and wind power generation unit includes the following steps:

predicting, by the comprehensive scheduling device, in a period of $0\sim T\times\Delta T$, the capacity information for a period $T\sim 2T\times\Delta T$ in the future according to the received capacity information of the coal-fired condensing-extraction combined heat and power unit and the wind power generation unit; under a condition that the power supply and heat supply are satisfied, according to the predicted capacity information in combination with the power consumption information of the user in the period of $0\sim T\times\Delta T$, reducing the water flow for heating output in the coal-fired condensing-extraction combined heat and power unit so that insufficient heat supply for the user due to the reduced hot water flow is compensated by the heat supply from the air conditioner heat pump consuming electricity, and calculating a compensation based on how long it is spent for the hot water to flow to and arrive at the user and the thermal inertia time, by the comprehensive scheduling device, where $\Delta T$ is sampling period and $T$ is times for collecting; and in the period of $T\sim 2T\times\Delta T$, calculating the scheduling signal according to a prediction and scheduling of the power supply and the heat supply and transmitting the scheduling signal, at a regulation and control period of $\Delta T$, by the comprehensive scheduling device; receiving the scheduling signal and controlling the water flow for heating output and electricity for power output of the coal-fired condensing-extraction combined heat and power unit, by the first remote centralized controller; receiving the scheduling signal and controlling the air conditioner heat pump to consume the power to supply heat, so as to compensate for insufficient heat supply due to the reduced hot water in the water-heating radiator, by the third remote centralized controller.

The generation of the scheduling signal by the comprehensive scheduling device includes the following steps:

1) collecting variations 1.1) collecting a power generation $P_{CHP}(t)$ and a thermal power generation $H_{CHP}(t)$ of the coal-fired condensing-extraction combined heat and power unit in the period of $0\sim T\times$ ΔT and transmitting to the comprehensive scheduling device, in which ΔT is a sampling period, and T is times for collecting and is a natural number;

collecting a power generation $p_j^{wind}(t)$ of each of No. 0~No. M wind power generators in the period of 0~T×ΔT, and transmitting to the comprehensive scheduling device;

1.2) collecting the following information of each of No. 0~No. N users in the period of 0~T×ΔT: the pipeline distance $S_i$ between the user and the coal-fired condensing-extraction combined heat and power unit as a heat source, the non-heating power consumption $P_i(t)$, a heat consumption $H_i(t)$ of the water-heating radiator, a installed capacity $P_i^{EHP}$ of the air conditioner heat pump and the thermal inertia time Ti input by the user, and transmitting to the comprehensive scheduling device;

2) calculating the following variations:

2.1) calculating a total output $$p_{sum}^{wind}(t) = \sum_{j=0}^{M} p_j^{wind}(t)$$

of the wind power generators in the period of 0~T×ΔT; according to the total output $p_{sum}^{wind}(t)$, predicting a total (t) output $P_{wind}(t)$ of the wind power generators in the period of T~2T×ΔT by using statistical analysis;

predicting the power generation $P_{CHP}(t)$ and the thermal power generation $H_{CHP}(t)$ in the period of T~2T×ΔT according to the collected power generation and $P_{CHP}(t)$ and thermal power generation $H_{CHP}(t)$ of the coal-fired condensing-extraction combined heat and power unit in the period of 0~T×ΔT;

2.2) calculating an equivalent distance $$s_i^* = \frac{\frac{S_i}{v} + T_i}{\Delta T}$$

between each user to the coal-fired condensing-extraction combined heat and power unit, in which v is the flow rate of the hot water in the pipeline; and performing a rounding operation on the result $s_i = [s_i^*]$;

dividing users who have the same $s_i$ into the same group, $s_i = l$ for the lth group; there are totally L groups, in which L is a natural number;

grouping all users and calculating the total heating load $H_{load}(l)$ and heat pump capacity $P_{CHP}(l)$ of users in respective groups;

$H_{load}(l) = \Sigma H_i(t,l)$, in which $H_i(t,l)$ is the heating load of the user i in the lth group at time instant t;

$P_{EHP}(l) = \Sigma_i P_i^{EHP}(l)$, in which $P_i^{EHP}(l)$ is the heat pump capacity of the user i in the lth group;

3) acquiring an iterative solution for a optimization problem formed by a objective function (1) and constraints (2 to 14) by using $P_{CHP}(t)$, $H_{CHP}(t)$, $P_{load}(t)$, $H_{load}(l)$, $P_{EHP}(l)$, to acquire the minimum value of the objective function as a result and to acquire respective variations as regulation and control signals;

3.1) the objective function being:
Min:

$$\Delta p = \sqrt{\sum_{t=T}^{2T}(p_{wind}(t) - \overline{p}_{wind})^2/(T+1)} ; \quad (1)$$

in which $P_{wind}(t)$ is a regulated equivalent total wind power output, and $\overline{p}_{wind}$ is an equivalent average wind power, and their expressions are as follows:

$$p_{wind}(t) = P_{wind}(t) + (p_{CHP}(t) - P_{CHP}(t)) - P_{EHPs}(t); \quad (2)$$

in which $P_{CHP}(t)$ is a regulated power generation of the coal-fired condensing-extraction combined heat and power unit, $P_{CHP}(t)$ is the predicted power generation of the coal-fired condensing-extraction combined heat and power unit and $P_{EHPs}(t)$ is the power consumption of the air conditioner heat pumps of all of the users at the time instant t;

$$\overline{p}_{wind} = \Sigma p_{wind}(t)/(T+1); \quad (3)$$

3.2) the constraints
3.2.1) heat load balance equation

Δh(t) denoting power of the insufficient heat supply at the supply side in the case that the thermal power generation is reduced and having the following expression:

$$\Delta h(t) = H_{CHP}(t) - h_{CHP}(t) \quad (4)$$

in which, $H_{CHP}(t)$ is the predicted thermal power generation of the coal-fired condensing-extraction combined heat and power unit and $h_{CHP}(t)$ is the regulated thermal power generation of the coal-fired condensing-extraction combined heat and power unit;

considering how long it is spent for the hot water to flow to and arrive at the user in the pipeline and the thermal inertia time, the compensation Δh(t) needed when the user uses the air conditioner heat pump being expressed as follows:

$$\Delta h(t) = \sum_{l=0}^{L} h_{EHP}(t+l, l); (T \le t+l \le 2T) \quad (5)$$

in which $H_{EHP}(t+l,l)$ is the sum of the heat supply powers of the heat pumps of the users in the lth group at the time instant t+l;

3.2.2) constraints of the coal-fired condensing-extraction combined heat and power unit:

a power generation lower limit:
$$p_{CHP}^{min}(t) = l_{CHP}^{min} \cdot h_{CHP}(t) + n_{CHP}^{min} \quad (6)$$

a power generation upper limit:
$$p_{CHP}^{max}(t) = l_{CHP}^{max} \cdot h_{CHP}(t) + n_{CHP}^{max} \quad (7)$$

a power generation constraint:
$$p_{CHP}^{min}(t) < p_{CHP}(t) \le p_{CHP}^{max}(t) \quad (8)$$

a heat supply output constraint: $5 \le h_{CHP}(t) \le h_{CHP}^{max}(t) \quad (9)$ additional constraint for the power generation lower limit of the combined heat and power: $p_{CHP}(t) \ge P_{CHP} \quad (10)$ in which $p_{CHP}(t)$ is the regulated power generation of the coal-fired condensing-extraction combined heat and power unit, $h_{CHP}(t)$ is the regulated heat supply output of the coal-fired condensing-extraction combined heat and power unit; $l_{CHP}^{min}$, $n_{CHP}^{min}$, $l_{CHP}^{max}$ and $n_{CHP}^{max}$ are working condition curve parameters of the coal-fired condensing-extraction combined heat and power unit; and in order to avoid a time-consuming restart when the heat supply output of the coal-fired condensing-extraction combined heat and power unit is 0, the heat supply output lower limit is limited to be 5 MW in the equation (9), and there is a limitation that the regulated power generation of the coal-fired condensing-extraction combined heat and power unit is larger than the originally planned power generation:

$$p_{CHP}(t) \geq P_{CHP}(t); \quad (11)$$

3.2.3) constrains of the air conditioner heat pump at the user side the constrain for the ratio of electrical to thermal power: $h_{EHP}(t,l) = COP_{EHP} \cdot p_{EHP}(t,l)$ (12)

in which $h_{EHP}(t,l)$ is the sum of the heat supply powers of the heat pumps of the users in the lth group at the time instant t, and $COP_{EHP}$ is the coefficient of performance of the air conditioner heat pumps;

output upper limit: $0 \leq p_{EHP}(t,l) \leq \min(P_{EHP}(l), H_{load}(l)/COP_{EHP})$; (13)

the sum of power consumption of the heat pumps of all the user groups in each period:

$$p_{EHPs}(t) = \sum_{l=0}^{L} p_{EHP}(t, l) \quad (14)$$

4) generating and transmitting, by the comprehensive scheduling device, the scheduling signal according to the regulated variations in the calculation results:

transmitting the power generation $p_{CHP}(t)$ and the heat supply output $h_{CHP}(t)$ of the coal-fired condensing-extraction combined heat and power unit to the first remote centralized controller, to control the operations of the first remote centralized controller in each period in the future regulation time;

transmitting the power consumption $p_{EHP}(t,l)$ and heat supply amount $h_{CHP}(t,l)$ of the air conditioner heat pump of the user to the third remote centralized controller, to control the operations of the third remote centralized controller in each period in the future regulation time.

Compared with the prior art, the invention has the following advantageous technical effects.

According to the joint heat supply system of combined heat and power unit and wind power generation unit and the scheduling method thereof provided by the invention, the smooth output of the wind power is achieved by the combined control of the combined heat and power unit and the heating load. A user adopts two modes for heat supply, namely the mode using the hot water radiator and the mode using the power-consuming heat pump. The hot water is supplied by the thermal and electric power generation unit and the power is supplied by both the thermal and electric power generation unit and the wind power generation unit. After the comprehensive scheduling device detects the energy supply and the power consumption condition of the user in a certain time period, a prediction is made for a period in the future by using the multiple regression statistical analysis method and, based on the prediction, the scheduling is performed.

Under a condition that the power supply and heat supply are satisfied, the water flow for heating output is reduced and the reduced heat is compensated by consuming power. The power-consuming heat supply can compensate the insufficient hot water heating and increase load in a valley period of power supply.

Moreover, if the coal-fired condensing-extraction combined heat and power unit reduces water flow for heating output, its power generation also changes correspondingly. The power generation may be increased or reduced as required to meet the supply requirements in cooperation with the wind power generation according to the change of the power consumption.

Figure 6:
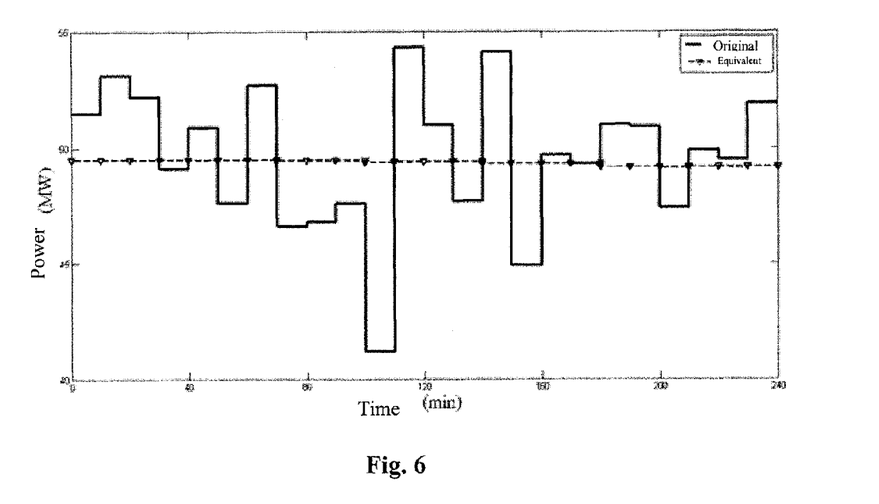
FIG. 6 is a curve chart showing comparison between the original wind power output and the adjusted wind power equivalent output.

Therefore, the wind power generation and combined heat and power are combined. According to the fluctuation of the wind power generation, the change of the output of the combined heat and power and the change of the power consumption condition of the user are regulated at same detecting period and regulation period by way of continuous regulation based on the real-time detection and prediction, so to realize the wind power equivalent smooth output on the user side. As shown in FIG. 6, the regulation has significant effect.

Furthermore, according to the invention, the differences between the two different heat supply modes, that is, the transmission delay of the hot water in the pipeline, the transient of the electric power compensated heat supply, and the user's thermal inertia time (user acceptable time during which the heat supply is stopped), are also taken into account. Therefore, the power compensation can be performed differently according to different pipeline distance between the user and the heat source, and the heat compensation for the user is performed by considering the difference of the time for heat supply, so as to fully take into account the energy changes of the supply side and the user side, whereby the smooth output of the wind power is facilitated, and the actual need of the user and the effective utilization of the energy source are considered.

BRIEF DESCRIPTION OF THE DRAWINGS

Technical solutions of the embodiments of the present applicant and/or the prior art will be illustrated more clearly with the following brief description of the drawings Apparently, the drawings referred in the following description constitute only some embodiments of the invention. Those skilled in the art may obtain some other drawings from these drawings without any creative work.

DETAILED DESCRIPTION OF THE INVENTION

The above objectives, technical solution and advantages of the present invention will be more apparent when read in conjunction with the accompanying drawings and the following detailed description of the embodiments of the present invention. It is obvious that the described embodiments are only some of the embodiments according to the present invention. Other embodiments obtained by those skilled in the art based on the embodiments in the present invention without any creative work fall into the scope of the present invention.

The invention provides a joint heat supply system of combined heat and power unit and wind power generation unit and a scheduling method thereof. At the supply side, the power is supplied by both the thermal and electric power generation unit and the wind power generation unit, and the hot water is supplied by the thermal and electric power generation unit. A user adopts modes for heat supply, namely the mode using the hot water radiator and the mode using the power-consuming heat pump. Based on a historical detection, a prediction of power supply and power consumption for a period in the future is made. The reduced hot water output is compensated by the power-consuming heat supply. Therefore, with respect to the fluctuation of the wind power generation, the power consumption of the user may be adjustable (the power-consuming heat supply can compensate the insufficient hot water heating and increase load in a valley period of power supply). Moreover, for the compensation in the heating adopting the two heat supply modes the transmission delay in the pipeline, the transient of the electric power compensation heat supply, and the user's thermal inertia time are taken into account, to achieve effective regulation of the entire system. The invention will be described further in detail in conjunction with the specific system configuration and regulation method as follows. The following description is explanative rather than limiting.

Figure 1:
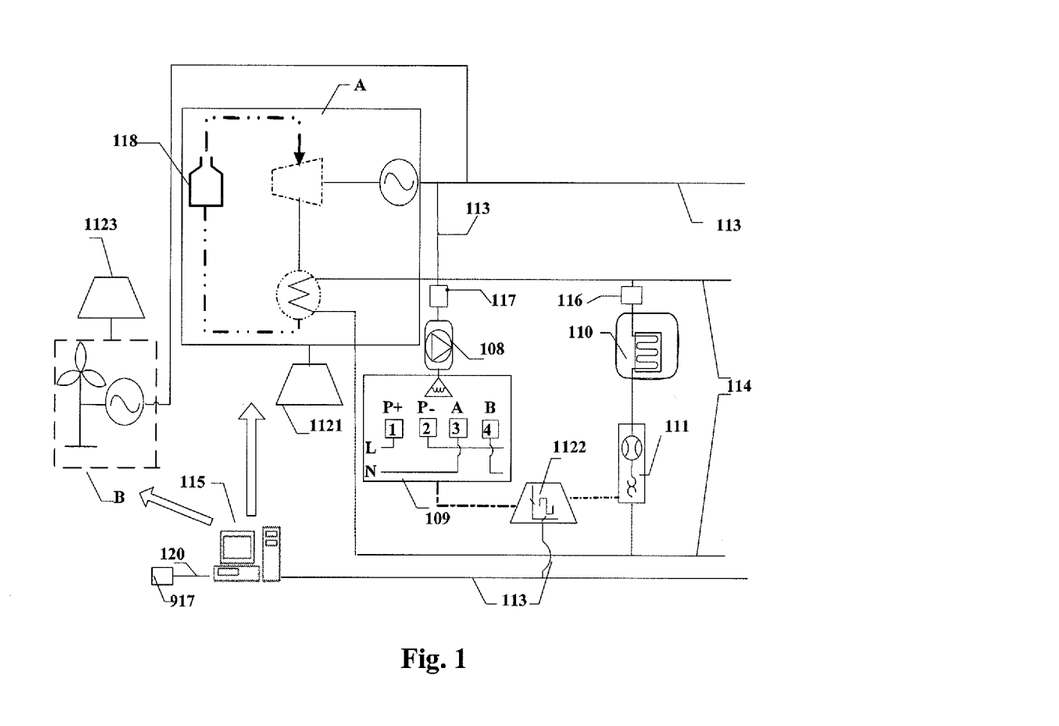
FIG. 1 is schematic view of connection in a joint heat supply system of combined heat and power unit and wind power generation unit according to the invention.

Referring to FIGS. 1 to 5, a combined heat and power unit and wind power generation unit joint heat supply system, including:

a coal-fired condensing-extraction combined heat and power unit A configured to produce electric power and heating water;

a wind power generation unit B configured to produce electric power;

an air conditioner heat pump 108 of a user connected in parallel with the coal-fired condensing-extraction combined heat and power unit A and the wind power generation unit B via a power cable network 113; a remote switch 117 for the air conditioner heat pump configured to control the air conditioner heat pump 108;

a power meter configured to collect non-heating power consumption of the user;

a water-heating radiator 110 of the user connected with the coal-fired condensing-extraction combined heat and power unit A via a heat supply network 114; a water consumption meter 111 for the water-heating radiator configured to detect the hot water consumption of the water-heating radiator 110; a remote switch 116 for the water-heating radiator, configured to control the water-heating radiator 110;

a first remote centralized controller 1121 configured to collect capacity information, which includes water flow for heating output and electricity for power output, of the coal-fired condensing-extraction combined heat and power unit A and transmit the capacity information to a comprehensive scheduling device 115; and in which the first remote centralized controller 1121 is further configured to receive a scheduling signal transmitted by the comprehensive scheduling device 115 and control a control and execution device 118 of the coal-fired combined heat and power unit to actuate according to the scheduling signal;

a second remote centralized controller 1122 configured to collect capacity information, which includes electricity for power output, of the wind power generation unit B and transmit the capacity information to the comprehensive scheduling device 115;

a third remote centralized controller 1123 configured to: store pipeline distance information of the user between the water-heating radiator 110 of the user and the coal-fired condensing-extraction combined heat and power unit A; collect capacity information including hot water inflow and non-heating power consumption detected by the water consumption meter 111 for the water-heating radiator and the non-heating power consumption of the user; collect thermal inertia time (user acceptable time during which the heat supply is stopped) input by the user; and transmit the pipeline distance information of the user, the collected capacity information and the thermal inertia time to the comprehensive scheduling device 115;

in which the third remote centralized controller 1123 is further configured to receive the scheduling signal transmitted by the comprehensive scheduling device 115 and drive the remote switch 117 for the air conditioner heat pump and/or the remote switch 116 for the heating radiator to actuate according to the scheduling signal; and the comprehensive scheduling device 115 generates the scheduling signal according to the received capacity information, and the pipeline distance information and the power consumption information of the user and transmits the scheduling signal to the first remote centralized controller 1121 and/or the third remote centralized controller 1123.

Specifically, under a condition that the power supply and heat supply are satisfied, according to the received capacity information of the coal-fired condensing-extraction combined heat and power unit A and the wind power generation unit B and the power consumption information of the user, the comprehensive scheduling device 115 reduces the water flow for heating output of the coal-fired condensing-extraction combined heat and power unit A so that the insufficient heat supply for the user due to the reduced hot water flow is compensated by the heat supply from the air conditioner heat pump 108 consuming electricity. When the reduced heat is compensated by power-consuming air conditioner heat pump 108, how long it is spent for the hot water to flow to and arrive at the user and the thermal inertia time are taken into consideration.

The comprehensive scheduling device 115 transmits the scheduling signals including the water flow for heating output and the electricity for power output of the coal-fired condensing-extraction combined heat and power unit A during scheduling time, amount of the hot water flowing into the water-heating radiator 110 and the heating power consumption of the air conditioner heat pump 108.

Figure 2:
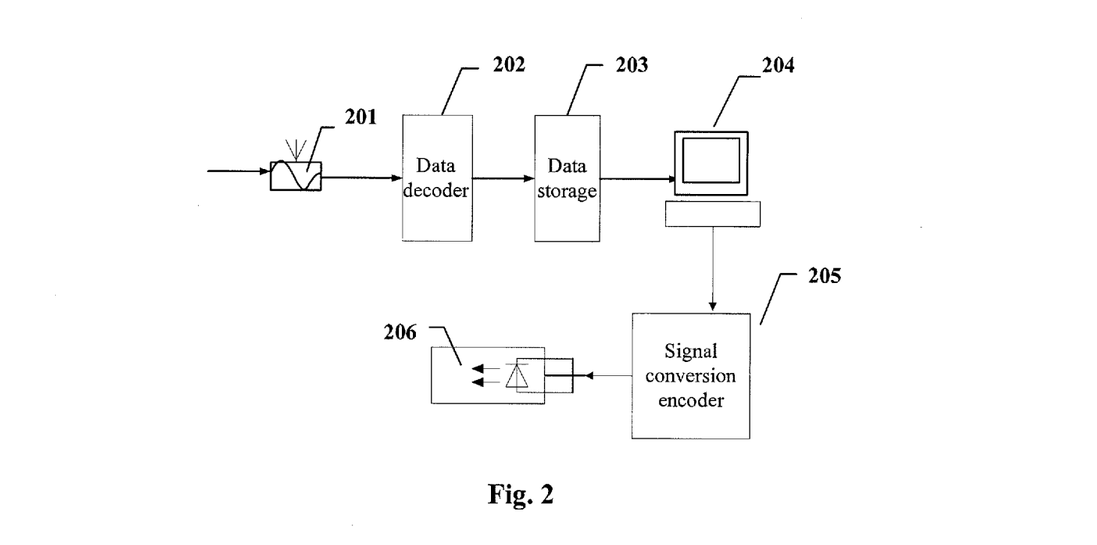
FIG. 2 is a schematic structural view of a comprehensive scheduling device.

Referring to FIG. 2, the comprehensive scheduling device 115 includes:

a first data receiving unit 201 configured to receive the capacity information of the coal-fired condensing-extraction combined heat and power unit A and the wind power generation unit B, and the pipeline distance information and the power consumption information of the user;

a data decoder unit 202 configured to decode all of the received data;

a data storage unit 203 configured to store all of the decoded data;

a scheduling signal calculation unit 204 configured to generate the scheduling signal;

a signal encoder 205 configured to encode the scheduling signal; and a transmitting unit 206 configured to transmit the generated signal to the first remote centralized controller 1121 and the third remote centralized controller 1123.

Figure 3:
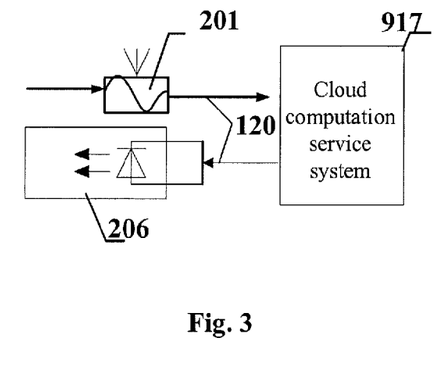
FIG. 3 is a schematic view of connection between the comprehensive scheduling device and a cloud compute.

Referring to FIG. 3, the comprehensive scheduling device 115 is connected with a cloud compute service system 917 via a power optical fiber 120 and drives the cloud compute service system 917 to compute for the scheduling signal; the comprehensive scheduling device 115 receives the scheduling signal obtained by the cloud compute service system 917 via the power optical fiber 120, and then transmits the scheduling signal to the first remote centralized controller 1121 and/or the third remote centralized controller 1123 via the power optical fiber or by way of wireless transmission.

In the remote control mode:

the remote switch 116 for the water-heating radiator is coupled with the comprehensive scheduling device 115 in a remote control way via the third remote centralized controller 1123; the remote switch 117 for the air conditioner heat pump is coupled with the comprehensive scheduling device 115 in the remote control way via the third remote centralized controller 1123; on the air conditioner heat pump 108, there is further provided an air-conditioner-specific power meter 109 configured to detect the power consumption of the air conditioner heat pump 108, which is collected by the third remote centralized controller;

the control and execution device 118 of the coal-fired combined heat and power unit is coupled with the comprehensive scheduling device 115 in the remote control way via the first remote centralized controller 1121; the control and execution device 118 of the coal-fired combined heat and power unit controls, according to the scheduling signal, a coal feed valve, a boiler steam inlet valve, a heating steam extraction valve and a power generation steam flow valve connected with the control and execution device 118 of the coal-fired combined heat and power unit to actuate.

Figure 4:
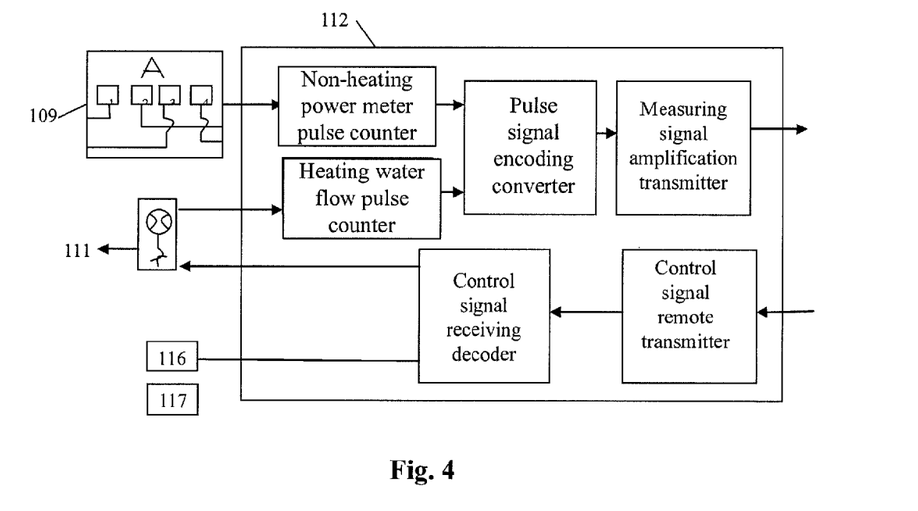
FIG. 4 is a schematic structural view of a third remote centralized controller.

Referring to FIG. 4, the third remote centralized controller 1123 includes a non-heating power meter pulse counter, a heating water flow pulse counter, a pulse signal encoding converter and a measuring signal amplification transmitter, as well as a control signal receiving decoder and a remote signal generator which are connected to each other;

the non-heating power meter pulse counter is connected with a non-heating power meter of the user and is configured to detect non-heating power consumption of the user, which is processed by the pulse signal encoding converter and the measuring signal amplification transmitter and is transmitted to the comprehensive scheduling device 115;

the heating water flow pulse counter is connected with the water consumption meter 111 for the water-heating radiator and is configured to detect the hot water inflow, which is processed by the pulse signal encoding converter and the measuring signal amplification transmitter to generate a signal which is transmitted to the comprehensive scheduling device 115 together with the pipeline information of the user; and the control signal receiver decoder receives and decodes the schedule information transmitted by the comprehensive scheduling device 115, and transmits the control signal to the remote switch 117 for the air conditioner heat pump and the remote switch 116 for the water-heating radiator for actuation via the control signal remote transmitter.

Figure 5:
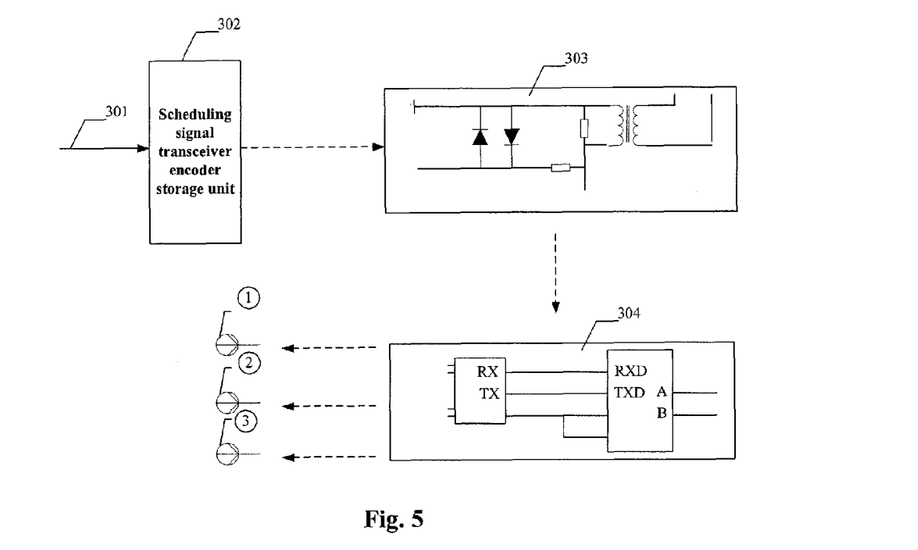
FIG. 5 is a schematic structural view of an execution device of the combined heat and power unit.

Referring to FIG. 5, the control and execution device 118 of the coal-fired combined heat and power unit includes a scheduling signal transceiver encoder storage 302, a drive circuit 303 and a mechanical gear control device 304. The scheduling signal is decoded by the scheduling signal transceiver encoder storage, so as to generate a schedule command for the coal-fired combined heat and power unit. The mechanical gear control device is triggered by a power drag signal output by the drive circuit. Then the mechanical gear control device controls the coal feed valve, the heating steam extraction valve and the power generation steam flow valve of the coal-fired combined heat and power unit to actuate.

A method based on the above mentioned joint heat supply system of combined heat and power unit and wind power generation unit includes the following steps:

predicting, by the comprehensive scheduling device, in a period of $0\sim T\times\Delta T$, the capacity information for a period $T\sim 2T\times\Delta T$ in the future by using the multiple regression statistical analysis method according to the received capacity information of the coal-fired condensing-extraction combined heat and power unit and the wind power generation unit; under a condition that the power supply and heat supply are satisfied, according to the predicted capacity information in combination with the power consumption information of the user in the period of $0\sim T\times\Delta T$, reducing the heating water flow for heating output of the coal-fired condensing-extraction combined heat and power unit so that insufficient heat supply for the user due to the reduced hot water flow is compensated by the heat supply from the air conditioner heat pump consuming electricity, and calculating a compensation based on how long it is spent for the hot water to flow to and arrive at the user and the thermal inertia time, by the comprehensive scheduling device, where $\Delta T$ is a sampling period and T is times for collecting;

in the period of $T\sim 2T\times\Delta T$, calculating the scheduling signal according to a prediction and scheduling of the power supply and the heat supply and transmitting the scheduling signal, at a regulation and control period of $\Delta T$, by the comprehensive scheduling device; receiving the scheduling signal and controlling the water flow for heating output and electricity for power output of the coal-fired condensing-extraction combined heat and power unit, by the first remote centralized controller; receiving the scheduling signal and controlling the air conditioner heat pump to consume the power to supply heat, so as to compensate for insufficient heat supply due to the reduced hot water in the water-heating radiator, by the third remote centralized controller.

Thereby, the regulation is performed in the system at same detecting period and regulation period by way of continuous regulation based on the real-time detection and prediction.

Specifically, the generation of the scheduling signal by the comprehensive scheduling device includes the following steps:

1) collecting variations 1.1) collecting the power generation $P_{CHP}(t)$ and the thermal power generation $H_{CHP}(t)$ of the coal-fired condensing-extraction combined heat and power unit in the period of $0\sim T\times\Delta T$ and transmitting to the comprehensive scheduling device, in which $\Delta T$ is a sampling period (may be 15~30 min), and T is times for collecting and is a natural number;

collecting the power generation $P_j^{wind}(t)$ of each of No. 0~No. M wind power generators in the period of $0\sim T\times\Delta T$, and transmitting to the comprehensive scheduling device;

1.2) collecting the following information of each of No. 0~No. N users in the period of $0\sim T\times\Delta T$: the pipeline distance $S_i$ between the user and the coal-fired condensing-extraction combined heat and power unit as a heat source, the non-heating power consumption, $P_i(t)$ a heat consumption $H_i(t)$ of the water-heating radiator, a installed capacity $P_i^{EHP}$ of the air conditioner heat pump and the thermal inertia time Ti input by the user, and transmitting to the comprehensive scheduling device;

2) calculating the following variations:
2.1) calculating a total output $$p_{sum}^{wind}(t) = \sum_{j=0}^{M} p_j^{wind}(t)$$

of the wind power generators in the period of 0~T×ΔT; according to the total output $p_{sum}^{wind}(t)$, predicting a total output wind $P_{wind}(t)$ of the wind power generators in the period of T~2T×ΔT by using statistical analysis;

predicting the power generation $P_{CHP}(t)$ and the thermal power generation $H_{CHP}(t)$ in the period of T~2T×ΔT according to the collected power generation $P_{CHP}(t)$ and thermal power generation $H_{CHP}(t)$ of the coal-fired condensing-extraction combined heat and power unit in the period of 0~T×ΔT;

22) calculating an equivalent distance $$s_i^* = \frac{\frac{S_i}{v} + T_i}{\Delta T}$$

between each user to the coal-fired condensing-extraction combined heat and power unit, in which v is the flow rate of the hot water in the pipeline; and performing a rounding operation on the result $s_i = [s_i^*]$;

dividing users who have the same $s_i$ into the same group, $s_i = l$ for the lth group; there are totally L groups, in which L is a natural number;

grouping all users and calculating the total heating load $H_{load}(l)$ and heat pump capacity $P_{EHP}(l)$ of users in respective groups;

$H_{load}(l) = \Sigma H_i(t,l)$, in which $H_i(t,l)$ is the heating load of the user i in the lth group at time instant t;

$P_{EHP}(l) = \Sigma P_i^{EHP}(l)$, in which $P_i^{EHP}(l)$ is the heat pump capacity of the user i in the lth group;

3) acquiring an iterative solution for a optimization problem formed by a objective function (1) and constraints (2 to 14) by using $P_{CHP}(t)$, $H_{CHP}(t)$, $P_{load}(t)$, $H_{load}(l)$, $P_{EHP}(l)$, so as to acquire the minimum value of the objective function as a result and to acquire respective variations (i.e. the regulation and control quantity of respective variations for a period in the future) as regulation and control signals;

3.1) the objective function being:
Min:

$$\Delta p = \sqrt{\sum_{t=T}^{2T}(p_{wind}(t) - \overline{p}_{wind})^2 / (T+1)} ; \quad (1)$$

in which $p_{wind}(t)$ is a regulated equivalent total wind power output, and $\overline{p}_{wind}$ is an equivalent average wind power, and their expressions are as follows:

$$p_{wind}(t) = P_{wind}(t) + (p_{CHP}(t) - P_{CHP}(t)) - p_{EHPs}(t); \quad (2)$$

in which $p_{CHP}(t)$ is the regulated power generation of the coal-fired condensing-extraction combined heat and power unit, $P_{CHP}(t)$ is the predicted power generation of the coal-fired condensing-extraction combined heat and power unit and $P_{EHPs}(t)$ is the power consumption of the air conditioner heat pumps of all of the users at the time instant t;

$$\overline{p}_{wind} = \Sigma p_{wind}(t)/(T+1); \quad (3)$$

3.2) the constraints
3.2.1) heat load balance equation

Δh(t) denoting power of the insufficient heat supply at the supply side in the case that the thermal power generation is reduced and having the following expression:

$$\Delta h(t) = H_{CHP}(t) - h_{CHP}(t); \quad (4)$$

in which, $H_{CHP}(t)$ is the predicted thermal power generation of the coal-fired condensing-extraction combined heat and power unit and $h_{CHP}(t)$ is the regulated thermal power generation of the coal-fired condensing-extraction combined heat and power unit;

considering how long it is spent for the hot water to flow to and arrive at the user in the pipeline and the thermal inertia time, the compensation Δh(t) needed when the user uses the air conditioner heat pump being expressed as follows:

$$\Delta h(t) = \sum_{l=0}^{L} h_{EHP}(t+l, l); \quad (T \leq t+l \leq 2T) \quad (5)$$

in which $h_{EHP}(t+l,l)$ is the sum of the heat supply powers of the heat pumps of the users in the lth group at the time instant t+l;

3.2.2) constraints of the coal-fired condensing-extraction combined heat and power unit:

a power generation lower limit:
$$p_{CHP}^{min}(t) = l_{CHP}^{min} \cdot h_{CHP}(t) + n_{CHP}^{min} \quad (6)$$

a power generation upper limit:
$$p_{CHP}^{max}(t) = l_{CHP}^{max} \cdot h_{CHP}(t) + n_{CHP}^{max} \quad (7)$$

a power generation constraint:
$$p_{CHP}^{min}(t) \leq p_{CHP}(t) \leq p_{CHP}^{max}(t) \quad (8)$$

a heat supply output constraint: $5 \leq h_{CHP}(t) \leq h_{CHP}^{max}(t) \quad (9)$ additional constraint for the power generation lower limit of the combined heat and power:
$$P_{CHP}(t) \geq P_{CHP} \quad (10)$$

in which $p_{CHP}(t)$ is the regulated power generation of the coal-fired condensing-extraction combined heat and power unit, $h_{CHP}(t)$ CHP is the regulated heat supply output of the coal-fired condensing-extraction combined heat and power unit; $l_{CHP}^{min}$, $n_{CHP}^{min}$, $l_{CHP}^{max}$ and $n_{CHP}^{max}$ are working condition curve parameters of the coal-fired condensing-extraction combined heat and power unit; and in order to avoid a time-consuming restart when the heat supply output of the coal-fired condensing-extraction combined heat and power unit is 0, the heat supply output lower limit is limited to be 5 MW in the equation (9), and there is a limitation that the regulated power generation of the coal-fired condensing-extraction combined heat and power unit is larger than the originally planned power generation:

$$p_{CHP}(t) \geq P_{CHP}(t); \quad (11)$$

3.2.3) constrains of the air conditioner heat pump at the user side the constrain for the ratio of electrical to thermal power: $h_{EHP}(t,l) = COP_{EHP} \cdot p_{EHP}(t,l) \quad (12)$ in which $h_{EHP}(t,l)$ is the sum of the heat supply powers of the heat pumps of the users in the in the lth group at the time instant t, and $COP_{EHP}$ is the coefficient of performance of the air conditioner heat pumps;

output upper limit: $0 \leq p_{EHP}(t,l) \leq \min(P_{EHP}(l), H_{load}(l)/COP_{EHP})$; (13)

the sum of power consumption of the heat pumps of all the user groups in each period:

$$p_{EHPs}(t) = \sum_{l=0}^{L} p_{EHP}(t, l) \quad (14)$$

4) generating and transmitting, by the comprehensive scheduling device, the scheduling signal according to the regulated variations in the calculation results:

transmitting the power generation $p_{CHP}(t)$ and the heat supply output $h_{CHP}(t)$ of the coal-fired condensing-extraction combined heat and power unit to the first remote centralized controller, to control the operations of the first remote centralized controller in each period in the future regulation time;

transmitting the power consumption $P_{EHP}(t,l)$ and heat supply amount $h_{EHP}(t,l)$ of the air conditioner heat pump of the user to the third remote centralized controller, to control the operations of the third remote centralized controller in each period in the future regulation time.

Referring to the curve chart showing comparison between the original wind power output and the adjusted wind power equivalent output shown in FIG. 6, it can be seen that the wind power output before the regulation fluctuates greatly, and the wind power output is relatively smooth after the regulation. According to the comparison, the effect is significant.

The invention claimed is:

1. A joint heat supply system of combined heat and power unit and wind power generation unit, comprising:
    a coal-fired condensing-extraction combined heat and power unit configured to produce electric power and heating water;
    a wind power generation unit configured to produce electric power;
    an air conditioner heat pump of a user connected in parallel with the coal-fired condensing-extraction combined heat and power unit and the wind power generation unit via a power cable network; a remote switch for the air conditioner heat pump configured to control the air conditioner heat pump;
    a power meter configured to collect non-heating power consumption of the user;
    a water-heating radiator of the user connected with the coal-fired condensing-extraction combined heat and power unit via a heat supply network; a water consumption meter for the water-heating radiator configured to detect the hot water consumption of the water-heating radiator; a remote switch for the water-heating radiator configured to control the water-heating radiator;
    a first remote centralized controller configured to collect capacity information comprising water flow for heating output and electricity for power output, of the coal-fired condensing-extraction combined heat and power unit and transmit the capacity information to a comprehensive scheduling device; wherein the first remote centralized controller is further configured to receive a scheduling signal transmitted by the comprehensive scheduling device and control a control and execution device of the coal-fired combined heat and power unit to actuate according to the scheduling signal;
    a second remote centralized controller configured to collect capacity information of electricity for power output in the wind power generation unit and transmit the capacity information to the comprehensive scheduling device;
    a third remote centralized controller configured to store pipeline distance information of the user between the water-heating radiator of the user and the coal-fired condensing-extraction combined heat and power unit; to collect capacity information comprising hot water inflow and non-heating power consumption detected by the water consumption meter for the water-heating radiator and the non-heating power consumption of the user; to collect thermal inertia time input by the user; and to transmit the pipeline distance information of the user, the collected capacity information and the thermal inertia time to the comprehensive scheduling device;
    wherein the third remote centralized controller is further configured to receive the scheduling signal transmitted by the comprehensive scheduling device and drive the remote switch for the air conditioner heat pump and/or the remote switch for the heating radiator to actuate according to the scheduling signal; and
    the comprehensive scheduling device generates the scheduling signal according to the received capacity information, and the pipeline distance information and the power consumption information of the user and transmits the scheduling signal to the first remote centralized controller and/or the third remote centralized controller.

2. The joint heat supply system of combined heat and power unit and wind power generation unit according to claim 1, wherein:
    under a condition that the power supply and heat supply are satisfied, according to the received capacity information of the coal-fired condensing-extraction combined heat and power unit and the wind power generation unit and the power consumption information of the user, the comprehensive scheduling device reduces the water flow for heating output of the coal-fired condensing-extraction combined heat and power unit so that the insufficient heat supply for the user due to the reduced hot water flow is compensated by the heat supply from the air conditioner heat pump consuming electricity; and
    the comprehensive scheduling device transmits the scheduling signals comprising the water flow for heating output and the electricity for power output of the coal-fired condensing-extraction combined heat and power unit during scheduling time, amount of the hot water flowing into the water-heating radiator and the heating power consumption of the air conditioner heat pump.

3. The joint heat supply system of combined heat and power unit and wind power generation unit according to claim 2, wherein when the heating is compensated by the air conditioner heat pump consuming power, how long it is spent for the hot water to flow to and arrive at the user and the thermal inertia time are taken into consideration.

4. The joint heat supply system of combined heat and power unit and wind power generation unit according to claim 1, wherein the comprehensive scheduling device comprises:
    a first data receiving unit configured to receive the capacity information of the coal-fired condensing-extraction combined heat and power unit and the wind power generation unit, and the pipeline distance information and the power consumption information of the user;
    a data decoder unit configured to decode all of the received data;

a data storage unit configured to store all of the decoded data;

a scheduling signal calculation unit configured to generate the scheduling signal;

a signal encoder configured to encode the scheduling signal; and a transmitting unit configured to transmit the generated signal to the first remote centralized controller and the third remote centralized controller.

5. The joint heat supply system of combined heat and power unit and wind power generation unit according to claim 1, wherein the comprehensive scheduling device is connected with a cloud compute service system via a power optical fiber and drives the cloud compute service system to compute for the scheduling signal; the comprehensive scheduling device receives the scheduling signal obtained by the cloud compute service system via the power optical fiber, and then transmits the scheduling signal to the first remote centralized controller and/or the third remote centralized controller via the power optical fiber or by way of wireless transmission.

6. The joint heat supply system of combined heat and power unit and wind power generation unit according to claim 1, wherein the remote switch for the water-heating radiator is coupled with the comprehensive scheduling device in a remote control way via the third remote centralized controller; the remote switch for the air conditioner heat pump is coupled with the comprehensive scheduling device in the remote control way via the third remote centralized controller; on the air conditioner heat pump, there is further provided an air-conditioner heat pump-specific power meter configured to detect the power consumption of the air conditioner heat pump, where the power consumption of the air conditioner heat pump is collected by the third remote centralized controller;

the control and execution device of the coal-fired combined heat and power unit is coupled with the comprehensive scheduling device in the remote control way via the first remote centralized controller; the control and execution device of the coal-fired combined heat and power unit controls, according to the scheduling signal, a coal feed valve, a boiler steam inlet valve, a heating steam extraction valve and a power generation steam flow valve connected with the control and execution device of the coal-fired combined heat and power unit to actuate.

7. The joint heat supply system of combined heat and power unit and wind power generation unit according to claim 1, wherein the third remote centralized controller comprises a non-heating power meter pulse counter, a heating water flow pulse counter, a pulse signal encoding converter and a measuring signal amplification transmitter, as well as a control signal receiving decoder and a remote signal generator which are connected to each other;

the non-heating power meter pulse counter is connected with a non-heating power meter of the user and is configured to detect non-heating power consumption of the user, which is processed by the pulse signal encoding converter and the measuring signal amplification transmitter and is transmitted to the comprehensive scheduling device;

the heating water flow pulse counter is connected with the water consumption meter for the water-heating radiator and is configured to detect the hot water inflow, which is processed by the pulse signal encoding converter and the measuring signal amplification transmitter to generate a signal which is transmitted to the comprehensive scheduling device together with the pipeline information of the user; and the control signal receiver decoder receives and decodes the schedule information transmitted by the comprehensive scheduling device, and transmits the control signal to the remote switch for the air conditioner heat pump and the remote switch for the water-heating radiator for actuation via the control signal remote transmitter.

8. The joint heat supply system of combined heat and power unit and wind power generation unit according to claim 1, wherein the control and execution device of the coal-fired combined heat and power unit comprises a scheduling signal transceiver encoder storage, a drive circuit and a mechanical gear control device; the scheduling signal is decoded by the scheduling signal transceiver encoder storage, so as to generate a schedule command for the coal-fired combined heat and power unit; the mechanical gear control device is triggered by a power drag signal output by the drive circuit; then the mechanical gear control device controls the coal feed valve, the heating steam extraction valve and the power generation steam flow valve of the coal-fired combined heat and power unit to actuate.

9. A scheduling method of a joint heat supply system of combined heat and power unit and wind power generation unit wherein the joint heat supply system of combined heat and power unit and wind power generation unit comprises:

a coal-fired condensing-extraction combined heat and power unit configured to produce electric power and heating water;

a wind power generation unit configured to produce electric power;

an air conditioner heat pump of a user connected in parallel with the coal-fired condensing-extraction combined heat and power unit and the wind power generation unit via a power cable network; a remote switch for the air conditioner heat pump configured to control the air conditioner heat pump;

a power meter configured to collect non-heating power consumption of the user;

a water-heating radiator of the user connected with the coal-fired condensing-extraction combined heat and power unit via a heat supply network; a water consumption meter for the water-heating radiator configured to detect the hot water consumption of the water-heating radiator; a remote switch for the water-heating radiator configured to control the water-heating radiator;

a first remote centralized controller configured to collect capacity information comprising water flow for heating output and electricity for power output, of the coal-fired condensing-extraction combined heat and power unit and transmit the capacity information to a comprehensive scheduling device; wherein the first remote centralized controller is further configured to receive a scheduling signal transmitted by the comprehensive scheduling device and control a control and execution device of the coal-fired combined heat and power unit to actuate according to the scheduling signal;

a second remote centralized controller configured to collect capacity information of electricity for power output in the wind power generation unit and transmit the capacity information to the comprehensive scheduling device;

a third remote centralized controller configured to store pipeline distance information of the user between the water-heating radiator of the user and the coal-fired condensing-extraction combined heat and power unit; to collect capacity information comprising hot water inflow and non-heating power consumption detected by the water consumption meter for the water-heating radiator and the non-heating power consumption of the user; to collect thermal inertia time input by the user; and to transmit the pipeline distance information of the user, the collected capacity information and the thermal inertia time to the comprehensive scheduling device;

wherein the third remote centralized controller is further configured to receive the scheduling signal transmitted by the comprehensive scheduling device and drive the remote switch for the air conditioner heat pump and/or the remote switch for the heating radiator to actuate according to the scheduling signal; and the comprehensive scheduling device generates the scheduling signal according to the received capacity information, and the pipeline distance information and the power consumption information of the user and transmits the scheduling signal to the first remote centralized controller and/or the third remote centralized controller;

the scheduling method comprises the following steps:

predicting, by the comprehensive scheduling device, in a period $0$~$T\times\Delta T$, the capacity information for a period $T$~$2T\times\Delta T$ in the future according to the received capacity information of the coal-fired condensing-extraction combined heat and power unit and the wind power generation unit; under a condition that the power supply and heat supply are satisfied, according to the predicted capacity information in combination with the power consumption information of the user in the period of $0$~$T\times\Delta T$, reducing the water flow for heating output in the coal-fired condensing-extraction combined heat and power unit so that insufficient heat supply for the user due to the reduced hot water flow is compensated by the heat supply from the air conditioner heat pump consuming electricity, and calculating a compensation based on how long it is spent for the hot water to flow to and arrive at the user and the thermal inertia time, by the comprehensive scheduling device, where $\Delta T$ is a sampling period and T is times for collecting; and in the period of $T$~$2T\times\Delta T$, calculating the scheduling signal according to a prediction and scheduling of the power supply and the heat supply and transmitting the scheduling signal at a regulation and control period of $\Delta T$, by the comprehensive scheduling device; receiving the scheduling signal and controlling the water flow for heating output and electricity for power output of the coal-fired condensing-extraction combined heat and power unit, by the first remote centralized controller; receiving the scheduling signal and controlling the air conditioner heat pump to consume the power to supply heat, so as to compensate for insufficient heat supply due to the reduced hot water in the water-heating radiator, by the third remote centralized controller.

10. The scheduling method of the joint heat supply system of combined heat and power unit and wind power generation unit according to claim 9, wherein the generation of the scheduling signal by the comprehensive scheduling device comprises the following steps:

1) collecting variations 1.1) collecting a power generation $P_{CHP}(t)$ and a thermal power generation $H_{CHP}(t)$ of the coal-fired condensing-extraction combined heat and power unit in the period of $0$~$T\times\Delta T$ and transmitting to the comprehensive scheduling device, where $\Delta T$ is a sampling period, and T is times for collecting and is a natural number;

collecting a power generation $p_j^{wind}(t)$ of each of No. 0~No. M wind power generators in the period of $0$~$T\times\Delta T$, and transmitting to the comprehensive scheduling device;

1.2) collecting following information of each of No. 0~No. N users in the period of $0$~$T\times\Delta T$: the pipeline distance $S_i$ between the user and the coal-fired condensing-extraction combined heat and power unit as a heat source, the non-heating power consumption $P_i(t)$, a heat consumption $H_i(t)$ of the water-heating radiator, a installed capacity $P_i^{EHP}$ of the air conditioner heat pump and the thermal inertia time Ti input by the user, and transmitting to the comprehensive scheduling device;

2) calculating the following variations:

2.1) calculating a total output $$p_{sum}^{wind}(t) = \sum_{j=0}^{M} p_j^{wind}(t)$$

of the wind power generators in the period of $0$~$T\times\Delta T$; according to the total output $p_{sum}^{wind}(t)$, predicting a total output $P_{wind}(t)$ of the wind power generators in the period of $T$~$2T\times\Delta T$ by using statistical analysis;

predicting the power generation $P_{CHP}(t)$ and the thermal power generation $H_{CHP}(t)$ in the period of $T$~$2T\times\Delta T$ according to the collected power generation $P_{CHP}(t)$ and thermal power generation $H_{CHP}(t)$ of the coal-fired condensing-extraction combined heat and power unit in the period of $0$~$T\times\Delta T$;

2.2) calculating an equivalent distance $$s_i^* = \frac{\frac{S_i}{v} + T_i}{\Delta T}$$

between each user to the coal-fired condensing-extraction combined heat and power unit, wherein v is the flow rate of the hot water in the pipeline; and performing a rounding operation on the result $s_i=[s_i^*]$;

dividing users who have the same $s_i$ into the same group, wherein $s_i=l$ for the lth group; there are totally L groups, where L is a natural number;

grouping all users and calculating the total heating load $H_{load}(l)$ and heat pump capacity $P_{EHP}(t)$ of users in respective groups;

$H_{load}(l)=\Sigma H_i(t,l)$, where $H_i(t,l)$ is the heating load of the user i in the lth group at time instant t;

$P_{EHP}(l)=\Sigma P_i^{EHP}(l)$, where $P_i^{EHP}(l)$ is the heat pump capacity of the user i in the lth group;

3) acquiring an iterative solution for a optimization problem formed by a objective function (1) and constraints (2 to 14) by substituting $P_{CHP}(t)$, $H_{CHP}(t)$, $P_{load}(t)$, $H_{load}(l)$, $P_{EHP}(l)$, so as to acquire a minimum value of the objective function as a result and to acquire respective variations (i.e. the regulation and control quantity of respective variations for a period in the future) as regulation and control signals;

3.1) the objective function being:
Min:

$$\Delta p = \sqrt{\sum_{t=T}^{2T} (p_{wind}(t) - \overline{p}_{wind})^2 / (T+1)} ; \quad (1)$$

where $p_{wind}(t)$ is a regulated equivalent total wind power output, and $\overline{p}_{wind}$ is an equivalent average wind power, and their expressions are as follows:

$$p_{wind}(t) = P_{wind}(t) + (p_{CHP}(t) - P_{CHP}(t)) - P_{EHPs}(t); \quad (2)$$

where $P_{CHP}(t)$ is a regulated power generation of the coal-fired condensing-extraction combined heat and power unit, $P_{CHP}(t)$ is the predicted power generation output of the coal-fired condensing-extraction combined heat and power unit and $p_{EHPs}(t)$ is the power consumption of the air conditioner heat pumps of all of the users at the time instant t;

$$\overline{p}_{wind} = \Sigma p_{wind}(t)/(T+1); \quad (3)$$

3.2) the constraints
3.2.1) heat load balance equation
$\Delta h(t)$ denoting power of the insufficient heat supply at the supply side in the case that the thermal power generation is reduced and having the following expression:

$$\Delta h(t) = H_{CHP}(t) - h_{CHP}(t); \quad (4)$$

wherein, $H_{CHP}(t)$ is the predicted thermal power generation of the coal-fired condensing-extraction combined heat and power unit and $h_{CHP}(t)$ is the regulated thermal power generation of the coal-fired condensing-extraction combined heat and power unit;
considering how long it is spent for the hot water to flow to and arrive at the user in the pipeline and the thermal inertia time, the compensation $\Delta h(t)$ needed when the user uses the air conditioner heat pump being expressed as follows:

$$\Delta h(t) = \sum_{l=0}^{L} h_{EHP}(t+l, l); (T \le t+l \le 2T) \quad (5)$$

wherein $h_{EHP}(t-1,l)$ is the sum of the heat supply powers of the heat pumps of the users in the lth group at the time instant t+1;
3.2.2) constraints of the coal-fired condensing-extraction combined heat and power unit:

a power generation lower limit:
$$p_{CHP}^{min}(t) = l_{CHP}^{min} \cdot h_{CHP}(t) + n_{CHP}^{min} \quad (6)$$

a power generation upper limit:
$$p_{CHP}^{max}(t) = l_{CHP}^{max} \cdot h_{CHP}(t) + n_{CHP}^{max} \quad (7)$$

a power generation constraint:
$$p_{CHP}^{min}(t) \le p_{CHP}(t) \le p_{CHP}^{max}(t) \quad (8)$$

a heat supply output constraint: $5 \le h_{CHP}(t) \le h_{CHP}^{max}(t) \quad (9)$ additional constraint for the power generation lower limit of the combined heat and power:
$$P_{CHP}(t) \ge P_{CHP} \quad (10)$$

where $p_{CHP}(t)$ is the regulated power generation of the coal-fired condensing-extraction combined heat and power unit, $h_{CHP}(t)$ is the regulated heat supply output of the coal-fired condensing-extraction combined heat and power unit; $l_{CHP}^{min}$, $n_{CHP}^{min}$, $l_{CHP}^{max}$ and $n_{CHP}^{max}$ are working condition curve parameters of the coal-fired condensing-extraction combined heat and power unit;
and there is a limitation that the regulated power generation of the coal-fired condensing-extraction combined heat and power unit is larger than an originally planned power generation:

$$p_{CHP}(t) \ge P_{CHP}(t); \quad (11)$$

3.2.3) constrains of the air conditioner heat pump at the user side the constrain for the ratio of electrical to thermal power: $h_{EHP}(t,l) = COP_{EHP} \cdot p_{EHP}(t,l) \quad (12)$ where $h_{EHP}(t,l)$ is the sum of the heat supply powers of the heat pumps of the users in the lth group at the time instant t, and $COP_{EHP}$ is the coefficient of performance of the air conditioner heat pumps;

output upper limit: $0 \le p_{EHP}(t,l) \le \min(P_{EHP}(l), H_{load}(l)/COP_{EHP}); \quad (13)$ the sum of power consumption of the heat pumps of all the user groups in each period:

$$p_{EHPs}(t) = \sum_{l=0}^{L} p_{EHP}(t, l) \quad (14)$$

4) generating and transmitting, by the comprehensive scheduling device, the scheduling signal according to the regulated variations in the calculation results:
transmitting the power generation $p_{CHP}(t)$ and the heat supply output $h_{CHP}(t)$ of the coal-fired condensing-extraction combined heat and power unit to the first remote centralized controller, to control the operations of the first remote centralized controller in each period in the future regulation time;
transmitting the power consumption $p_{EHP}(t,l)$ and heat supply amount $h_{EHP}(t,l)$ of the air conditioner heat pump of the user to the third remote centralized controller, to control the operations of the third remote centralized controller in each period in the future regulation time.

* * * * *